United States Patent
Decraene et al.

(10) Patent No.: US 8,223,629 B2
(45) Date of Patent: Jul. 17, 2012

(54) CORE ROUTER CAPABLE OF SECURING THE OUTPUT ROUTER OF AN AUTONOMOUS SYSTEM

(75) Inventors: Bruno Decraene, Vanves (FR); Jean-Louis Le Roux, Lannion (FR)

(73) Assignee: France Telecom, Paris (FR)

( * ) Notice: Subject to any disclaimer, the term of this patent is extended or adjusted under 35 U.S.C. 154(b) by 177 days.

(21) Appl. No.: 12/442,365

(22) PCT Filed: Sep. 25, 2007

(86) PCT No.: PCT/FR2007/052003
§ 371 (c)(1),
(2), (4) Date: Mar. 20, 2009

(87) PCT Pub. No.: WO2008/037921
PCT Pub. Date: Apr. 3, 2008

(65) Prior Publication Data
US 2010/0020679 A1    Jan. 28, 2010

(30) Foreign Application Priority Data
Sep. 25, 2006   (FR) ...................................... 06 53925

(51) Int. Cl.
*H04J 1/16* (2006.01)
(52) U.S. Cl. ........ 370/219; 370/216; 370/217; 370/218; 370/220
(58) Field of Classification Search ........... 370/216–228
See application file for complete search history.

(56) References Cited

U.S. PATENT DOCUMENTS

| | | | |
|---|---|---|---|
| 7,590,046 B1 * | 9/2009 | Bhate et al. ................. | 370/216 |
| 7,903,584 B2 * | 3/2011 | Vasseur et al. .............. | 370/255 |
| 2005/0111351 A1 | 5/2005 | Shen | |
| 2006/0133265 A1 * | 6/2006 | Lee .............................. | 370/228 |
| 2006/0153067 A1 | 7/2006 | Vasseur | |
| 2006/0209682 A1 | 9/2006 | Filsfils | |
| 2007/0053284 A1 * | 3/2007 | Hu ............................... | 370/217 |
| 2007/0091795 A1 * | 4/2007 | Bonaventure et al. ........ | 370/228 |

FOREIGN PATENT DOCUMENTS

WO    WO 2005/013564    2/2005

OTHER PUBLICATIONS

R. Bless et al., "Fast Scoped Rerouting for BGP", The 11th IEEE Int'l. Conference on Sep. 28-Oct. 1, 2003, Piscataway, N.J., USA, pp. 25-30.

* cited by examiner

*Primary Examiner* — Raj Jain
*Assistant Examiner* — Ashil Farahmand
(74) *Attorney, Agent, or Firm* — Cozen O'Connor (57) ABSTRACT

A core router adapted to back up a nominal output router. This kind of core router of a first autonomous subsystem is connected to a nominal output router of the first autonomous system adapted to route traffic whose destination is a second autonomous system, the first autonomous system further including a back-up output router adapted to route traffic whose destination is the second autonomous system. The core router includes means for identifying a router of the first autonomous system, adapted to identify a router adapted to route traffic whose destination is the second autonomous system in the event of a failure affecting traffic to said nominal output router, the identified router being either the back-up output router or a protector router of the first autonomous system, this protector router being adapted to redirect traffic whose destination is the second autonomous system via said back-up output router; means for detecting a failure affecting routing of traffic to said nominal output router; and means for redirecting traffic whose destination is the second autonomous system in a predetermined route in a tunnel to the identified router, said tunnel not passing through the nominal output router.

10 Claims, 3 Drawing Sheets

CORE ROUTER CAPABLE OF SECURING THE OUTPUT ROUTER OF AN AUTONOMOUS SYSTEM

RELATED APPLICATIONS

This is a U.S. National Phase Application under 35 USC §371 of International Application PCT/FR2007/052003, filed on Sep. 25, 2007.

This application claims the priority of French application no. 06/53925 filed on Sep. 25, 2006, and the content of which is hereby incorporated by reference.

BACKGROUND OF THE INVENTION

The field of the invention is that of telecommunications and more particularly that of Internet Protocol/Multi Protocol Label Switching (IP/MPLS) networks.

The MPLS technology is not described here; for more information on this technology see the Internet Engineering Task Force (IETF) document Request for Comments (RFC) 3031.

The context of the invention is that of IP/MPLS networks including core routers, referred to as P routers, and access routers also referred to border routers (ASBR).

Some IP/MPLS networks, referred to as Flat IP networks, use IP switching in all core routers situated between the border routers.

Other IP/MPLS networks use MPLS switching in all core routers situated between the border routers, the border routers using MPLS tunnels to send IP packets. In this technique, which is more particularly described in section 4.6 "LSP Tunneling between BGP Border Routers" of the above-mentioned document RFC 3031, the core routers do not need to know the external routes announced by the border routers using the Border Gateway Protocol (BGP).

In pure BGP terminology, an ASBR is a border router of an autonomous system setting up an eBGP session with another autonomous system. The present document uses the concept of an output router of an autonomous system that corresponds to a more extensive definition of an ASBR and that, by definition, applies to any border router of the autonomous system announcing BGP routes for which it is an obligatory passage point, which means either that it is the BGP next hop or that the BGP next hop belongs to one of its interfaces.

Some communications services have a high demand in terms of availability (for example voice (VoIP) services and telemedicine services). These services require deterministic rerouting within less than 100 milliseconds (ms) in the event of a failure affecting the link or node. At present, the only technology offering such rerouting performance is the Fast Reroute technology that sets up in advance local back-up paths bypassing the protected element. In the event of a failure, the directly upstream node updates its routing table and diverts the traffic to the back-up path. This method requires no route calculation or signaling after the failure has occurred. Moreover, the back-up routes are pre-installed in the routing tables of the routers, which guarantees a deterministic rerouting time of less than 100 ms.

There are two modes of providing this protection:
the MPLS Fast Reroute mode, based on setting up end-to-end MPLS-TE primary tunnels locally protected by MPLS-TE back-up tunnels, this mode being described in the IETF document RFC 4090;
the IP Fast Reroute mode, based on protection of IP routes by back-up routes avoiding the protecting element and with no risk of loop; these back-up routes can be in connected mode with local back-up MPLS-TE tunnels or in non-connected mode if there is no risk of loop; for more details of this second mode see, for example:

Shen, Pan, "Nexthop Fast ReRoute for IP and MPLS" (http://www.potaroo.net/ietf/all-ids/draft-shen-nhop-fastreroute-01.txt); and Shand, Bryant, "IP Fast Reroute Framework", http://www.ietf.org/internet-drafts/draft-ietf-rtgwg-ipfrr-framework-05.txt.

The MPLS Fast Reroute mode, with meshing of the border routers by primary MPLS-TE tunnels, protects ASBR-P, P-P links and P nodes. It is not appropriate for large-scale networks because it requires meshing of all the ASBR and therefore requires a number of tunnels proportional to the square of the number of ASBR. It is therefore in practice applicable only to a small number of ASBR (approximately 100).

The IP Fast Reroute mode protects ASBR-P, P-P links and P nodes. It requires no MPLS-TE primary tunnels and is therefore more appropriate for large-scale networks.

Present day Fast Rerouter techniques as described above cannot protect the ASBR of an IP/MPLS network.

This is because the MPLS Fast Rerouter technique, as defined in the document RFC 4090, which requires RSVP-TE tunnels between the autonomous sites, cannot be used in large-scale networks.

Moreover, the IP Fast Reroute technique does not protect the ASBR, which are situated at the ends of tunnels or consist of designated output points of the network and can therefore not be bypassed in the event of a failure.

Moreover, present-day protection techniques use only the information of the Internal Gateway Protocol (IGP), which is an internal routing protocol, and can provide back up only for failures affecting internal elements of the network. Thus they cannot be used to back up the ASBR (border routers between two autonomous sites), protection thereof making it necessary to take account of external routing information distributed using the BGP protocol.

The only mechanisms providing back up against ASBR failures available at present are based on convergence of the BGP and provide back-up times exceeding one second, which is incompatible with the availability demands of real-time services.

To ensure good client router to client router availability, it is therefore essential to define new mechanisms providing fast ASBR protection and capable of supporting a large number of client routers (i.e. suitable for scaling up).

OBJECT AND SUMMARY OF THE INVENTION

A first aspect of the invention is directed to a core router of a first autonomous system, this core router being connected to a nominal output router of the first autonomous system adapted to route traffic whose destination is a second autonomous system, the first autonomous system further including a back-up output router adapted to route traffic whose destination is the second autonomous system, said core router including:

means for identifying a router of the first autonomous system, adapted to identify a router adapted to route traffic whose destination is the second autonomous system in the event of a failure affecting traffic to said nominal output router, the identified router being either the back-up output router or a protector router of the first autonomous system, this protector router being adapted to redirect traffic whose destination is the second autonomous system via said back-up output router;

means for detecting a failure affecting routing of traffic to said nominal output router; and means for redirecting traffic whose destination is the second autonomous system onto a predetermined route in a tunnel to the identified router that does not pass through the nominal output router.

The protection mechanism of the invention is based on local protection of a nominal output router by one or more core routers connected directly to that nominal output router. This kind of core router is referred to herein as a "P protector router".

In the event of a failure affecting routing of traffic from the core router to the nominal output router, the P protector router reroutes the traffic:

either to a back-up output router having an external back-up route to the second autonomous system;

or to a protector router adapted to divert the traffic to a back-up output router having an external back-up route to the second autonomous system.

In one particular embodiment, the router identification means use a correspondence table indicating a router to be used in the event of a failure. This correspondence table is pre-installed in a routing table of the core router. This feature has the advantage that it guarantees a deterministic rerouting time less than 100 ms in the event of a failure affecting communication with the nominal output router.

A second aspect of the invention is directed to a back-up output router adapted to cooperate with the core router of the invention.

The back-up output router of a first autonomous system, adapted to route traffic whose destination is a second autonomous system, includes:

means for exchanging with a core router of said first autonomous system information meaning that a tunnel is to be used in the event of a failure affecting routing of traffic from said core router to a nominal output router of said first autonomous system, this nominal output router being adapted to route traffic whose destination is the second autonomous system;

means for creating a contextual routing table including a route to said second autonomous system that does not pass through said nominal output router; and means for using said table to route packets received in said tunnel whose destination is the second autonomous system.

In another embodiment, the back-up output router of a first autonomous system adapted to route traffic whose destination is a second autonomous system includes:

means for exchanging with a core router of said first autonomous system a contextual label to be used in the event of a failure affecting routing of traffic from said core router to a nominal output router of said first autonomous system, this nominal output router being adapted to route traffic whose destination is the second autonomous system;

means for creating a contextual routing table including at least one route to said second autonomous system that does not pass through said nominal output router; and means for using said table to route packets received with said contextual label to the second autonomous system.

A third aspect of the invention is directed to a protector router adapted to cooperate with the core router of the invention.

The protector router that can be used in a first autonomous system includes:

means for exchanging with a core router of said first autonomous system information meaning that an input tunnel is to be used in the event of a failure affecting routing of traffic from said core router to a nominal output router of said first autonomous system, this nominal output router being adapted to route traffic whose destination is a second autonomous system;

means for creating a contextual routing table including at least one route to said second autonomous system that passes through a back-up output router of said first autonomous system adapted to route traffic whose destination is said second autonomous system, said route utilizing an output tunnel to said back-up output router that does not pass through said nominal output router; and means for using said table for directing packets whose destination is the second autonomous system received in said entry input to said output tunnel.

In another embodiment, the protector router that can be used in a first autonomous system includes:

means for exchanging with a core router of said first autonomous system a contextual label to be used in the event of a failure affecting the routing of traffic from said core router to a nominal output router of said first autonomous system, this nominal output router being adapted to route traffic whose destination is the second autonomous system;

means for creating a contextual routing table including at least one route to said second autonomous system that does not pass through said nominal output router;

means for creating a contextual routing table including a route to said second autonomous system that passes through a back-up output router of said first autonomous system adapted to route traffic whose destination is said second autonomous system, said route using an output tunnel to said back-up output router that does not pass through said nominal output router; and means for using said table to route packets whose destination is the second autonomous system received in said input tunnel into said output tunnel.

In one particular embodiment, the core router of the invention further includes means for exchanging with the end of the tunnel (in other words either with the back-up output router of the invention or with the protector router of the invention) information meaning that this tunnel is to be used in the event of said failure.

In another particular embodiment, the core router of the invention includes means for exchanging a contextual label to be used in the event of said failure and means for adding said contextual label to a packet before redirecting said traffic whose destination is the second autonomous system.

In another particular embodiment of the invention, the identification means of the protector core router, adapted to identify a router adapted to route traffic whose destination is the second autonomous system in the event of a failure affecting traffic to said nominal output router, identify a router to be used in the event of a failure from protection group announcements sent by routers of the first autonomous system.

In particular, a protection group identifier chosen by the nominal output router to be protected can be used. In this particular embodiment, the core router of the invention includes means for detecting the group identifier sent by the nominal output router and means for configuring its routing table with the protector router (or with the back-up output router) if it sends the same group identifier.

The protector core router can therefore discover dynamically the nominal output router or routers that it is protecting.

Likewise, the core router can discover dynamically the protector routers protecting a nominal output router.

According to the invention, an IP/MPLS network can contain a number of protection groups.

According to the invention, a router can belong to more than one protection group.

In one particular embodiment, the protection groups to which a nominal output router belongs are announced in the IGP routing protocol, using a new TLV in the IGP message used to announce the properties of the nodes.

Following a failure affecting a nominal output router, the nominal IGP, BGP, LDP, and RSVP-TE protocols react and the route to this nominal output router is eliminated from the tables of the other core routers and the other output routers.

Connectivity to this nominal output router and the BGP destinations announced by it is then lost until BGP convergence is achieved.

Because the invention corrects the failure locally, fast convergence is no longer indispensable. In contrast, it is preferable for convergence to take place without interruption between the nominal path and the back-up path. In particular, it is preferable to prevent the routers destroying the protected nominal path before they know the back-up path and are using it.

Thus in one particular embodiment, the core router of the invention includes means for deferring announcement of the failure to the other routers of the first autonomous system for at least a predetermined period.

In one particular embodiment, during this predetermined period, the core router of the invention announces a specific or high metric for contacting said nominal output router, typically the maximum metric allowed by the internal routing protocol.

This warns the source of the traffic that it should if possible use a back-up path.

In a second period, after allowing all of the network to converge toward the back-up path, the routing/signaling protocols announce the failure in the conventional way. In one embodiment, the protocol used by the back-up output router and/or the protector router of the invention is the BGP. They create a contextual routing table for each nominal output router that they protect. To select the BGP routes to be installed in this table, they consider all potential BGP routes, from which they retain:

routes whose output point or origin point is said nominal output router; and routes known via a BGP session previously set up between the back-up output router (or the protector router) and the nominal output router.

Accordingly, the back-up output router and/or the protection router do not select in their contextual routing table routes of the nominal output router (ASBR1) that will no longer be valid in the event of a failure affecting ASBR1.

Another aspect of the invention is directed to a routing method that can be used by a core router in a first autonomous system, this core router being connected to a nominal output router adapted to route traffic whose destination is a second autonomous system, the first system further including at least one back-up output router adapted to route traffic whose destination is the second autonomous system, said method including:

a step of identifying a router of the first autonomous system in which a router is identified that is adapted to route traffic whose destination is the second autonomous system in the event of failure affecting traffic to said nominal output router, the identified router being either the back-up output router or a protector router of the first autonomous system, this protector router being adapted to redirect traffic whose destination is the second autonomous system via said back-up output router;

a step of detecting a failure affecting routing of traffic to said nominal output router; and a step of redirecting traffic whose destination is the second autonomous system onto a predetermined route in a tunnel to the identified router that does not pass through the nominal output router.

Another aspect of the invention is directed to a routing method that can be used in a back-up output router in a first autonomous system and adapted to route traffic whose destination is a second autonomous system, this method including:

a step of exchanging with a core router of said first autonomous system information meaning that a tunnel is to be used in the event of a failure affecting routing of traffic from said core router to a nominal output router of said first autonomous system, this nominal output router being adapted to route traffic whose destination is said second autonomous system;

a step of creating a contextual routing table including at least one route to said second autonomous system that does not pass through said nominal output router; and a step of routing packets whose destination is said second autonomous system received in said tunnel using said table.

One embodiment of the invention is directed to a routing method that can be used in a back-up output router in a first autonomous system and is adapted to route traffic whose destination is a second autonomous system, this method including:

a step of exchanging with a core router of said first autonomous system a contextual label to be used in the event of a failure affecting routing of traffic from said core router to a nominal output router of said first autonomous system, this nominal output router being adapted to route traffic whose destination is the second autonomous system;

a step of creating a contextual routing table including at least one route to said second autonomous system that does not pass through said nominal output router; and a step of routing packets whose destination is said second autonomous system received with said contextual label using said table.

Another aspect of the invention is directed to a routing method that can be used in a protector router in a first autonomous system, this method including:

a step of exchanging with a core router of said first autonomous system information meaning that a tunnel is to be used in the event of a failure affecting routing of traffic from said core router to a nominal output router of said first autonomous system, this nominal output router being adapted to route traffic whose destination is a second autonomous system;

a step of creating a contextual routing table including at least one route to said second autonomous system that passes through a back-up output router of said first autonomous system and is adapted to route traffic whose destination is said second autonomous system, said route using an output tunnel to said back-up output router that does not pass through said nominal output router; and a step of routing packets whose destination is said second autonomous system received in said input tunnel into said output tunnel using said table.

One embodiment of the invention is directed to a routing method that can be used in a protector router in a first autonomous system, this method including:

a step of exchanging with a core router of said first autonomous system a contextual label to be used in the event of a failure affecting routing of traffic from said core router to a nominal output router of said first autonomous system, this nominal output router being adapted to route traffic whose destination is the second autonomous system;

a step of creating a contextual routing table including a route to said second autonomous system that passes through a back-up output router of said first autonomous system and is adapted to route traffic whose destination is said second autonomous system, said route using an output tunnel to said back-up output router that does not pass through said nominal output router; and a step of routing packets whose destination is the second autonomous system received with said contextual label into said output tunnel using said table.

In one particular embodiment, the steps of one or more of the above routing methods are determined by computer program instructions.

Consequently, another aspect of the invention is directed to a computer program on an information medium, which program can be executed in a router or more generally in a computer and includes instructions for executing the steps of a routing method as described above.

This program can use any programming language and take the form of source code, object code or a code intermediate between source code and object code, such as a partially compiled form, or any other desirable form.

Another aspect of the invention is directed to a computer-readable information medium containing instructions of a computer program as described above.

The information medium can be any entity or device capable of storing the program. For example, the support can include storage means such as a ROM, for example a CD ROM or a microelectronic circuit ROM, or magnetic storage means, for example a diskette (floppy disk) or a hard disk.

Moreover, the information medium can be a transmissible medium such as an electrical or optical signal, which can be routed via an electrical or optical cable, by radio or by other means. The program of the invention can in particular be downloaded over an Internet-type network.

Alternatively, the information medium can be an integrated circuit in which the program is incorporated, the circuit being adapted to execute the method in question or to be used in its execution.

BRIEF DESCRIPTION OF THE DRAWINGS

Other features and advantages of the present invention emerge from the following description with reference to the appended drawings, which show one non-limiting embodiment of the invention. In the figures.

Below, the term "tunnel" is to be understood to have a generic definition. A tunnel can be a Generic Routine Encapsulation (GRE) tunnel, a Layer 2 Tunneling Protocol Version 3 (L2TPv3) tunnel, or a Multi Protocol Label Switching (MPLS) tunnel.

DETAILED DESCRIPTION OF A FIRST EMBODIMENT

Figure 1:
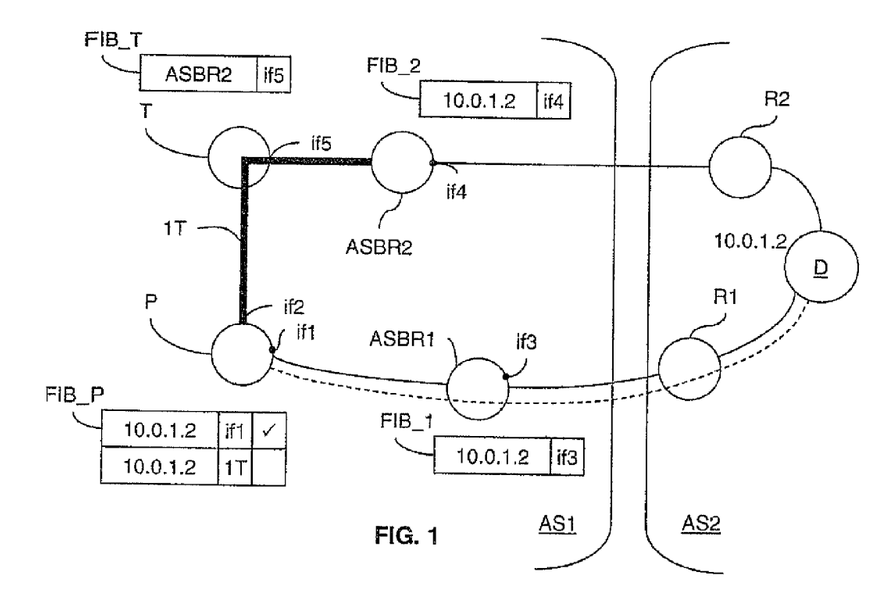
FIGS. 1 and 2 represent, in their environment, routers of a first embodiment of the invention.

FIG. 1 represents a network including two autonomous systems AS1 and AS2.

The autonomous system AS1 includes a core router P of the invention with a routing table FIB_P.

The core router P is connected to a nominal output router ASBR1 of the autonomous system AS1 adapted to route traffic whose destination is the second autonomous system AS2. The nominal output router ASBR1 has a routing table FIB_1.

The autonomous system AS1 also includes an output router ASBR2 of the invention for routing traffic whose destination is the second autonomous system AS2. The output router ASBR2 has a routing table FIB_2.

There are represented in the second autonomous system AS2 a destination D of address 10.0.1.2 and two routers R1 and R2 between the destination D and the output routers ASBR1 and ASBR2.

In the example described here, the first autonomous system AS1 includes a transit router T between the core router P and the output router ASBR2. The transit router T has a routing table FIB_T.

In the example described here, the core router P and the output router ASBR2 cooperate to bypass failures affecting routing of traffic from the core router P to the nominal output router ASBR1.

Consequently, the routing table FIB_P of the core router P includes two outputs for the destination D at the address 10.0.1.2, namely:

at its interface if1, a nominal output to the nominal output router ASBR1; and a back-up output to a predetermined route in a tunnel 1T that does not pass through the output router ASBR1, the end of this tunnel 1T consisting of the output router ASBR2.

The output router ASBR2 is therefore a back-up output router in the sense of the invention.

In the example described here, the tunnel 1T passes through the transit router T, and the routing table FIB_T of that router is configured to direct packets whose destination is the back-up output router ASBR2 to its interface if5.

FIG. 1 represents the state of the network before the failure affecting routing of traffic from the core router P to the nominal output router ASBR1.

Also, only the nominal output of the routing table FIB_P of the core router P is active. Consequently, when the core router P receives a packet whose destination is the site D, it directs that packet to its interface if1 whose destination is the nominal output router.

On reception of this packet, the nominal output router directs it, in accordance with its routing table FIB)1, to its interface if3 whose destination is the router R1 of the second autonomous system AS2, this packet finally being routed to the destination D in the second autonomous system.

The route taken by packets between the core router P and the destination D before the failure is represented in dashed line in FIG. 1.

Figure 2:
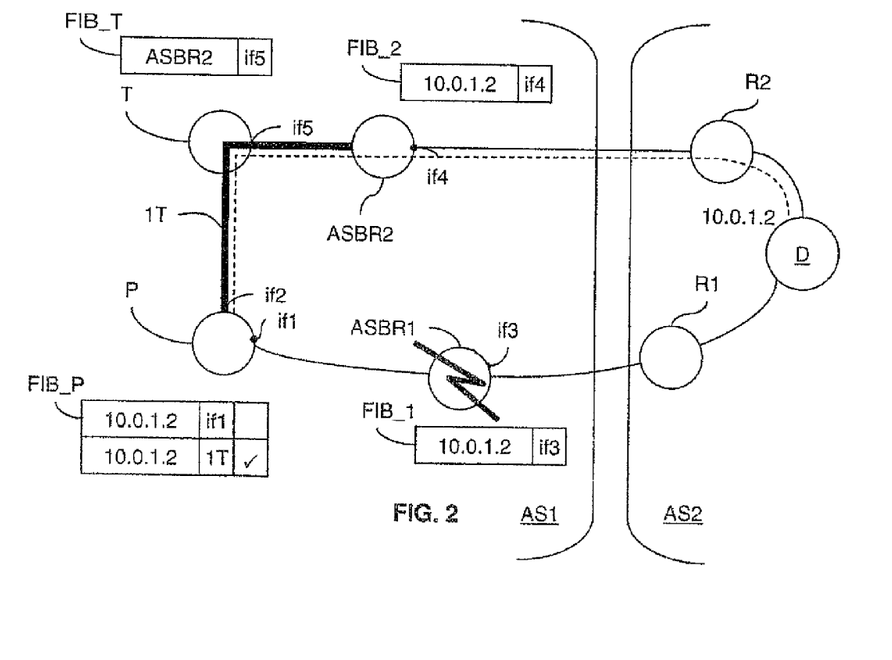

Referring to FIG. 2, assume now that a failure occurs that affects the nominal output router ASBR1.

According to the invention, the core router P detects a failure affecting its communication with the nominal output router ASBR1.

It then de-activates the nominal output in its routing table FIB_P and activates the back-up output to the tunnel 1T.

If the core router P receives a packet whose destination is the site D while this back-up output is active, it sends that packet in the tunnel 1T to the back-up router ASBR2.

On reception of this packet, the back-up output router ASBR2 sends it, in accordance with its routing table FIB_2, to its interface if4 to the router R2 of the second autonomous system AS2, this packet finally being routed to the destination D in the second autonomous system.

The route taken by packets between the core router P and the destination D after the failure is represented in dashed line in FIG. 2.

Detailed Description of a Second Embodiment

A second embodiment of the invention is described below with reference to FIGS. 3 and 4.

In the example described here, the first autonomous system AS1 includes a protector router ASBRP of the invention between the core router P and the back-up output router ASBR2. The protector router ASBRP has a routing table FIB_RP.

Figure 3:
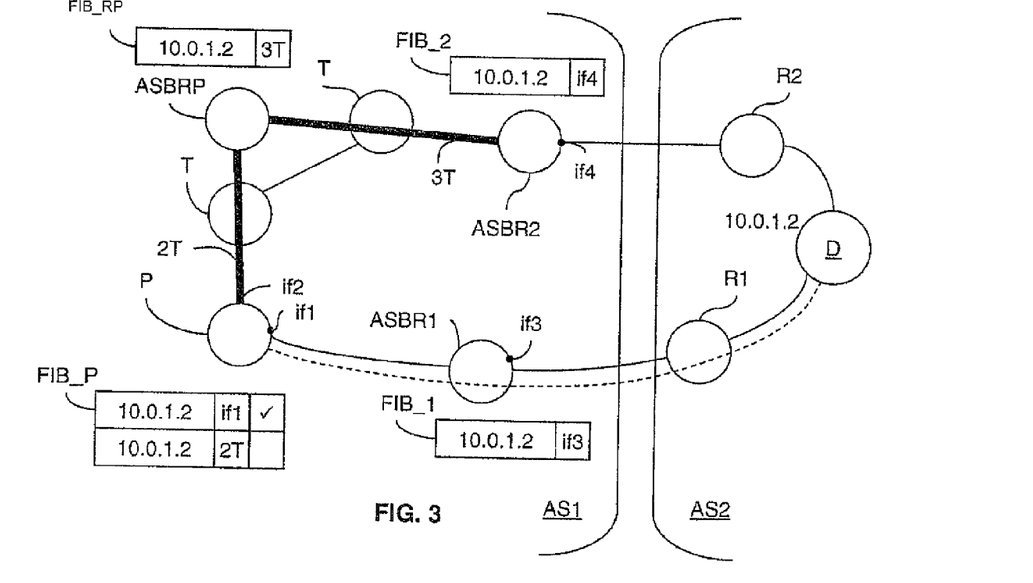
FIGS. 3 and 4 represent, in their environment, routers of a second embodiment of the invention.

In the FIG. 3 example, two transit routers T are represented:
one between the core router P and the protector router ASBRP; and
one between the protector router ASBRP and the back-up output router ASBR2.

The transit routers T are optional and are not relevant to the invention.

In the example described here, the core router P, the protector router ASBRP, and the output router ASBR2 cooperate to bypass failures affecting routing of traffic from the core router P to the nominal output router ASBR1.

Consequently, the routing table FIB_P of the core router P includes two outputs for the destination D at the address 10.0.1.2, namely:
at its interface if1, a nominal output to the nominal output router ASBR1; and
a back-up output to a predetermined route in a tunnel 2T that does not pass through the nominal output router ASBR1, the end of this tunnel 2T consisting of the protector router ASBRP of the first autonomous system AS1, which can redirect traffic whose destination is the second autonomous system AS2 via the back-up output router ASBR2.

In the embodiment described here, the tunnel 2T is used only to protect the nominal output router ASBR1.

If there were several nominal output routers to be protected, there could be used, for example:
either, in a first variant, a dedicated tunnel for each of these nominal routers;
or, in a second variant, a generic tunnel using a contextual label to distinguish packets whose original destination is the particular nominal router.

FIG. 3 represents the state of the network before the failure affecting communication of the core router P with the nominal output router ASBR1.

Also, only the nominal output of the routing table FIB_P of the core router P is active. Consequently, when the core router P receives a packet whose destination is the site D, it sends that packet to its interface if1 to the nominal output router.

On reception of this packet, the nominal output router sends it, in accordance with its routing table FIB_1, to its interface if3 to the router R1 of the second autonomous system AS2. This packet is finally routed to its destination in the second autonomous system.

The route taken by packets between the core router P and the destination D before the failure is represented in dashed line in FIG. 3.

Figure 4:
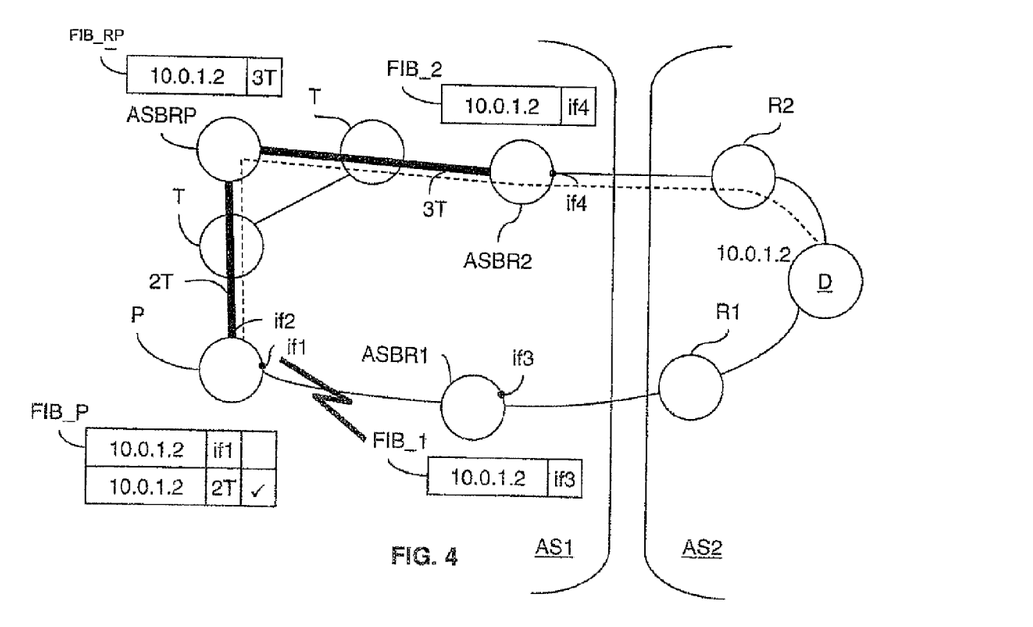

Referring to FIG. 4, assume now that a failure occurs that affects the link between the core router P and the nominal output router ASBR1.

According to the invention, the core router detects a failure affecting routing of traffic to the nominal output router ASBR1.

It then deactivates the nominal output listed in its routing table FIB_P and activates the back-up output to the channel 2T.

If the call router P receives a packet whose destination is the site D while this back-up output is active, it sends that packet in the tunnel 2T to the protector router ASBRP.

On reception of this packet, the protector router ASBRP sends it, in accordance with its routing table FIB_RP, in a tunnel 3T to the back-up output router ASB2.

On reception of this packet, the back-up output router ASBR2 sends it, in accordance with its routing table FIB_2, to its interface if4 to the router R2 of the second autonomous system AS2, this packet finally being routed to its destination D in the second autonomous system.

In the embodiment described here, the tunnel 3T is directly associated with the interface if4. A generic tunnel could be used instead, using a contextual label to distinguish packets whose destination is this particular interface.

In the embodiment described here, the routers have a standard computer hardware architecture. They include a processor, a read-only memory (ROM) in which a computer program can be stored, and a random-access memory (RAM) for executing that program.

Figure 5:
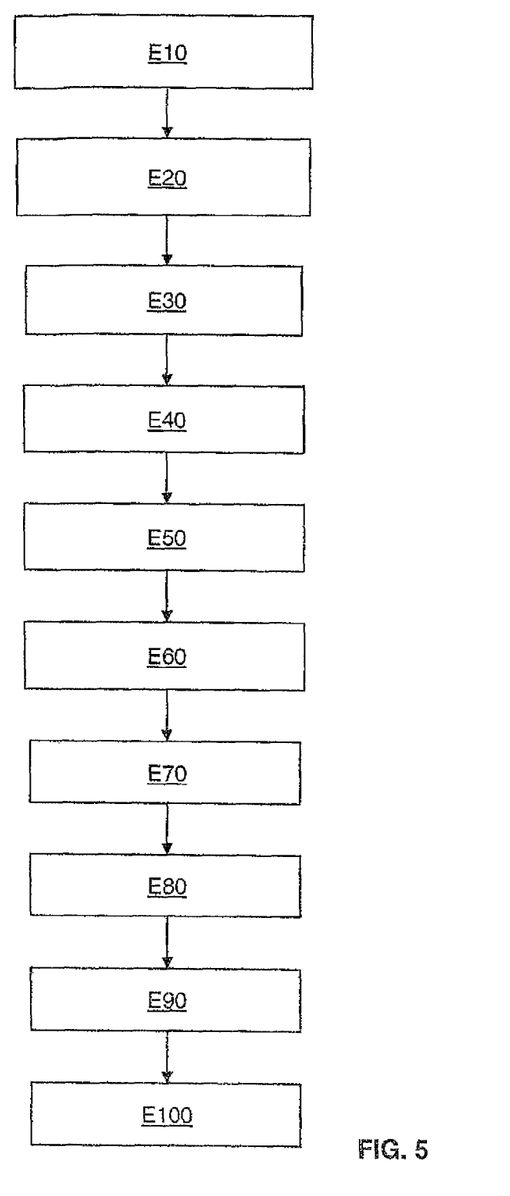
FIG. 5 represents in flowchart form the main steps of one particular embodiment of a first routing method of the invention.

In the embodiment described here, the core router P of the invention stores in its ROM a computer program of the invention including instructions for executing the steps of a routing method of the invention, of which the main steps E10 to E100 are represented in flowchart form in FIG. 5.

Figure 6:
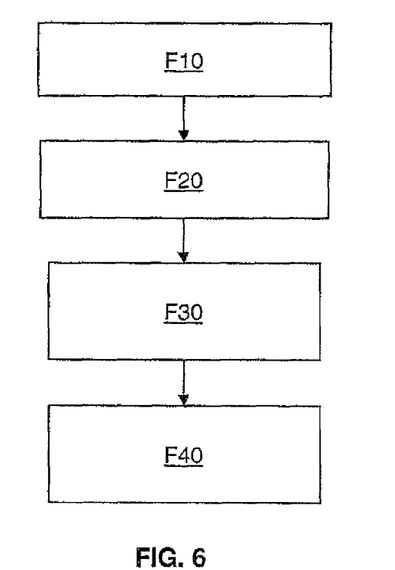
FIG. 6 represents in flowchart form the main steps of one particular embodiment of a second routing method of the invention.

In the embodiment described here, the back-up output router ASBR2 and the protector router ASBRP of the invention store in their ROM a computer program of the invention including instructions for executing the steps of a routing method of the invention of which the main steps F10 to F40 are represented in flowchart form in FIG. 6.

These methods are described below.

During a first step F10 of the routing method, the back-up output router ASBR2 and the protector router ASBRP announce their protection function and the identifier of a protection group to which they belong.

In this example:
the router ASBR1 announces "Nominal Output Router", group 1;
the router ASBR2 announces "Back-up Output Router", group 1; and
the router ASBRP announces "Protector Router", group 1.

The core router P of the invention receives these announcements in a step E10 of the routing method.

According to the invention, it deduces from them that the routers ASBR2 and ASBRP are protecting the nominal output router ASBR1, these three routers having announced that they belong to the same protection group, that with the identifier 1.

In this situation these routers then exchange information or a contextual label LB to be used in the event of a failure affecting routing of traffic between the core router P and the nominal output router ASBR1.

Contextual labels are exchanged in a step E20 of the routing method used by the core router P and in a step F20 of the routing method used by the back-up output router ASBR2 and the protector router ASBRP.

After reception of this contextual label, each of the routers ASBR2 and ASBRP configures a contextual routing table.

To be more precise, in a step E30, the core router P preinstalls in its routing table FIB_P:
- a nominal output to the output router ASBR1; and
- a back-up output either in a tunnel 1T to the back-up router ASBR2 or in a tunnel 2T to the protector router ASBRP.

The above first and second choices respectively allow the invention to be used in both embodiments described above with reference to FIGS. 1 and 2, respectively 3 and 4.

In the particular embodiment that has just been described, in a step E10 the core router P of the invention identifies the back-up router ASBR2 and the protector router ASBRP from protection group announcements.

In a variant of this particular embodiment, it uses a correspondence table in which the equipment (protector router, back-up output router) to be used in the event of a failure affecting a particular nominal output router are preconfigured. Accordingly, in the step E10, it identifies from the correspondence table the router to be used in the event of failure.

In the first embodiment, in a step F30 of the routing method, the back-up router ASBR2 creates a contextual routing table FIB_2 associated with the contextual label LB. Then, in a step F40, it determines the routes to be inserted in the table FIB_2.

In the second embodiment, in a step F30 of the routing method, the protector router ASBRP creates a contextual routing table FIB_RP associated with the contextual label LB. Then, in a step F40, it determines the routes to be inserted in the table FIB_RP.

The routing methods used in the back-up output router ASBR2 and the protector router ASBRP differ in how they determine the routes to be inserted in their contextual tables FIB_2 and FIB_RP.

In the step F40, the back-up output router ASBR2 selects the route from a set of potential BGP routes, from which it retains:
- routes whose exit point (next_hop) or origin point (originator_id) is the nominal output router ASBR1; and
- routes known via a BGP session previously set up between the back-up output router ASBR2 and the nominal output router ASBR1.

In this step F40, the protector router ASBRP selects the route from a set of potential BGP routes, from which it retains:
- routes whose exit point (next_hop) or origin point (originator_id) is the nominal output router ASBR1; and
- routes known via a BGP session previously set up between the protector router ASBRP and the nominal output router ASBR1.

According to the invention, the routes chosen by the back-up router ASBR2 and the protector router ASBRP do not pass through the nominal output router ASBR1.

Once its routing table FIB_P has been configured (step E30), the core router P of the invention, in a step E40, activates the nominal output listed in that table.

In a step E50 of the routing method, the core router P of the invention detects a failure detecting routing of traffic to the nominal output router ASBR1.

Following this detection, in a step E60, it activates the back-up output to redirect the traffic whose destination is the second autonomous system AS2 into the tunnel 1T or 2T. In this same step it de-activates the output to the nominal route.

In this situation, the core router P adds the contextual label LB to each packet before sending it in the tunnel 1T or 2T.

On reception of a packet including this contextual label, the back-up output router ASBR2, respectively the protector router ASBRP, routes the received packet to said autonomous system using the table FIB_2, respectively FIB_RP.

In the particular embodiment described here, the core router P of the invention defers announcing the failure to the other routers of the first autonomous system AS1 for a predetermined time.

To this end, in a step E70, it triggers a countdown initialized with this predetermined time.

In the particular embodiment described here, during this predetermined time (step E80) the core router P of the invention announces the maximum metric for contacting the nominal output router allowed by the internal routing protocol. In this way it warns the source of the traffic that it should if possible use a back-up path.

In the step E90 of the routing method, the core router P detects that the countdown has ended.

In a step E100, it then signals the failure in the conventional manner.

In one particular example of the first variant, a single tunnel is used for each failure. In this case, in a step E20 of the routing method used by the core router P and in a step F20 of the routing method used by the back-up output router ASBR2 and the protector router ASBRP, the core router P sets up a tunnel with the back-up output router ASBR2 or the protector router ASBRP and sends information meaning that the tunnel is to be used in the event of a failure affecting routing of traffic to the nominal output router ASBR1. In this case, in the step F30 of its routing method, the back-up output router ASBR2, respectively the protector router ASBRP, creates a contextual routing table FIB_2, respectively FIB_RP, associated with the failure. Then, in the step F40, it determines the routes to be inserted in the contextual routing table FIB_2, respectively FIB_RP.

The reception of a packet in this tunnel indicates to the back-up router ASBR2, respectively the protector router ASBRP, that a failure has occurred and that it must redirect traffic using the contextual routing table FIB_2, respectively FIB_RP, defined for that failure.

The invention claimed is:

1. A routing method in a first autonomous system, the first autonomous system comprising a core router connected to nominal output routers adapted to route traffic whose destination is a second autonomous system, the first autonomous system further including at least one back-up output router adapted to route traffic whose destination is the second autonomous system, the method comprising:
   identifying, by the core router, a router of the first autonomous system which is adapted to route traffic whose destination is the second autonomous system in the event of failure affecting traffic at least one of the nominal output routers;
   exchanging, for each of the nominal output routers, a contextual label between the core router and the identified router;
   installing a routing table in the core router which includes, for a destination of the second autonomous system, for each of the nominal output routers, a nominal output to the nominal output router, and a back-up output to a predetermined route in a tunnel beginning at the core router and ending at the identified router but which does not pass through the nominal output routers; and installing, for each exchanged contextual label, a contextual routing table associated with the contextual label in the identified router, the contextual routing table including, for a destination of the second autonomous system, at least one route which does not pass through the nominal output router, wherein, for each of the nominal output routers, the core router performs:

detecting whether there is a failure affecting routing of traffic to the nominal output router;

activating the nominal output of the routing table of the core router, if no failure is detected; and activating the back-up output of the routing table of the core router, if a failure is detected, and adding the exchanged contextual label associated with the nominal output router to each packet of the traffic sent in the tunnel, and wherein the identified router routes packets whose destination is the second autonomous system received with one of the exchanged contextual labels using the contextual routing table associated with the exchanged contextual label.

2. The routing method according to claim 1, wherein the identified router is the at least one back-up output router.

3. The routing method according to claim 1, wherein identified router is a protector router which is adapted to redirect traffic whose destination is the second autonomous system via the at least one back-up output router.

4. The routing method according to claim 1, wherein the identifying of the router which is adapted to route traffic in the event of failure is based on a correspondence table which indicates a router to be used in the event of a failure.

5. The routing method according to claim 1, wherein the identifying of the router which is adapted to route traffic in the event of failure is based on protection group announcements sent by routers of the first autonomous system.

6. A first autonomous system comprising a core router connected to nominal output routers adapted to route traffic whose destination is a second autonomous system, the first autonomous system further including at least one back-up output router adapted to route traffic whose destination is the second autonomous system, the system comprising:

means for identifying, in the core router, a router of the first autonomous system which is adapted to route traffic whose destination is the second autonomous system in the event of failure affecting traffic at least one of the nominal output routers;

means for exchanging, for each of the nominal output routers, a contextual label between the core router and the identified router;

means for installing a routing table in the core router which includes, for a destination of the second autonomous system, for each of the nominal output routers, a nominal output to the nominal output router, and a back-up output to a predetermined route in a tunnel beginning at the core router and ending at the identified router but which does not pass through the nominal output routers; and means for installing, for each exchanged contextual label, a contextual routing table associated with the contextual label in the identified router, the contextual routing table including, for a destination of the second autonomous system, at least one route which does not pass through the nominal output router, wherein the core router comprises:

means for detecting, for each of the nominal output routers, whether there is a failure affecting routing of traffic to the nominal output router;

means for activating the nominal output of the routing table of the core router, if no failure is detected; and means for activating the back-up output of the routing table of the core router, if a failure is detected, and adding the exchanged contextual label associated with the nominal output router to each packet of the traffic sent in the tunnel, and wherein the identified router routes packets whose destination is the second autonomous system received with one of the exchanged contextual labels using the contextual routing table associated with the exchanged contextual label.

7. The first autonomous system according to claim 6, wherein the means for identifying the router which is adapted to route traffic in the event of failure uses a correspondence table which indicates a router to be used in the event of a failure.

8. The first autonomous system according to claim 6, wherein means for the identifying the router which is adapted to route traffic in the event of failure uses protection group announcements sent by routers of the first autonomous system.

9. The first autonomous system according to claim 6, wherein the back-up output router is configured to use a BGP-type protocol and comprises means for selecting the at least one route from a set of potential BGP routes from which the back-up output router retains:

routes whose output point or origin point is the nominal output router; and routes known via a BGP session previously set up between the back-up output router and the nominal output router.

10. The first autonomous system according to claim 6, wherein the identified router is a protector router which is adapted to redirect traffic whose destination is the second autonomous system via the at least one back-up output router, and wherein the protector router is configured to use a BGP-type protocol and comprises means for selecting the at least one route from a set of potential BGP routes from which the protector router retains:

routes whose output point or origin point is the nominal output router; and routes known via a BGP session previously set up between the protector router and the nominal output router.

* * * * *